Feb. 25, 1947. J. S. GARDEN 2,416,578
SEPARATOR LOADING MACHINE
Filed June 30, 1942 4 Sheets-Sheet 2
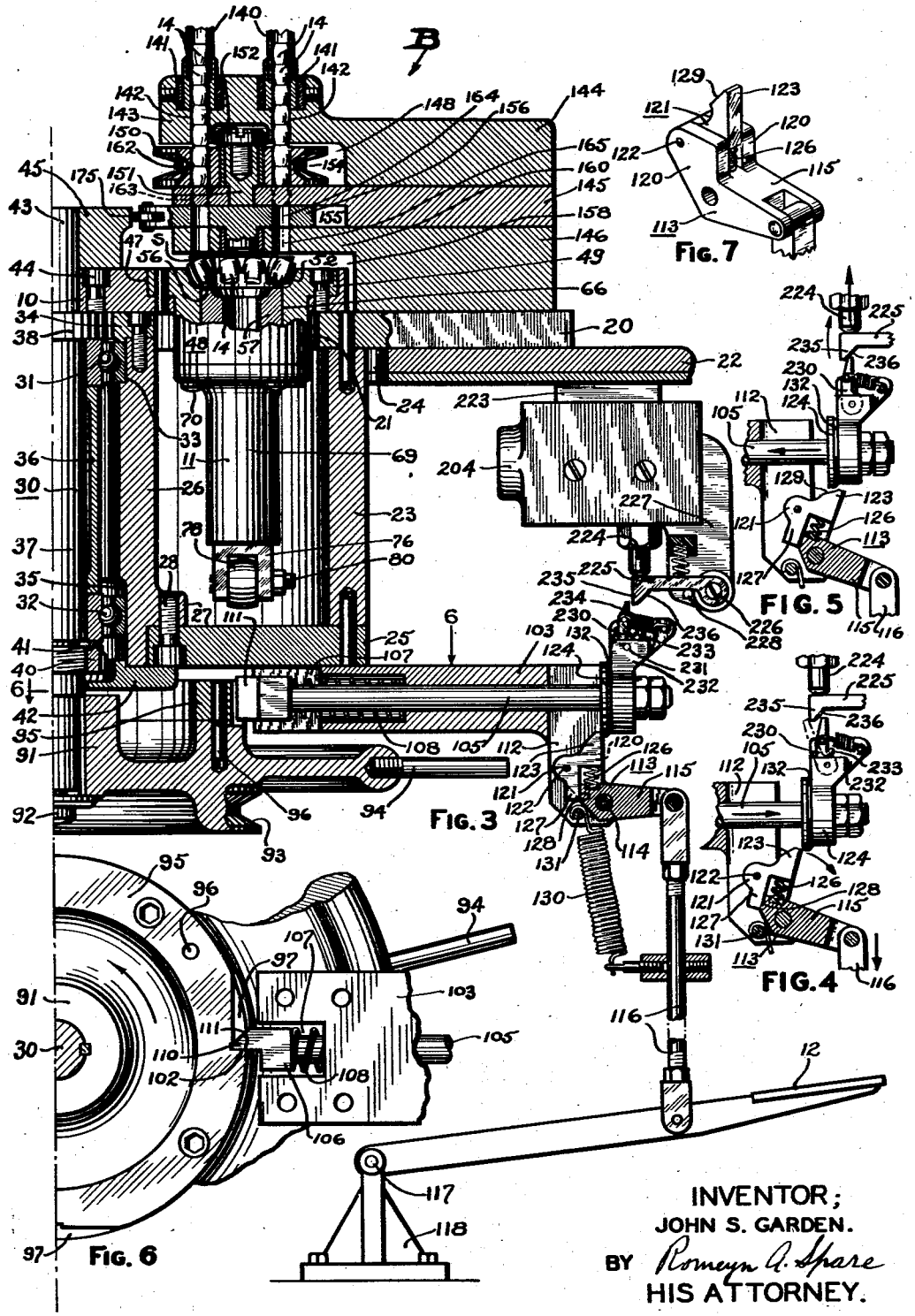
INVENTOR;
JOHN S. GARDEN.
BY Romeyn A. Spare
HIS ATTORNEY.

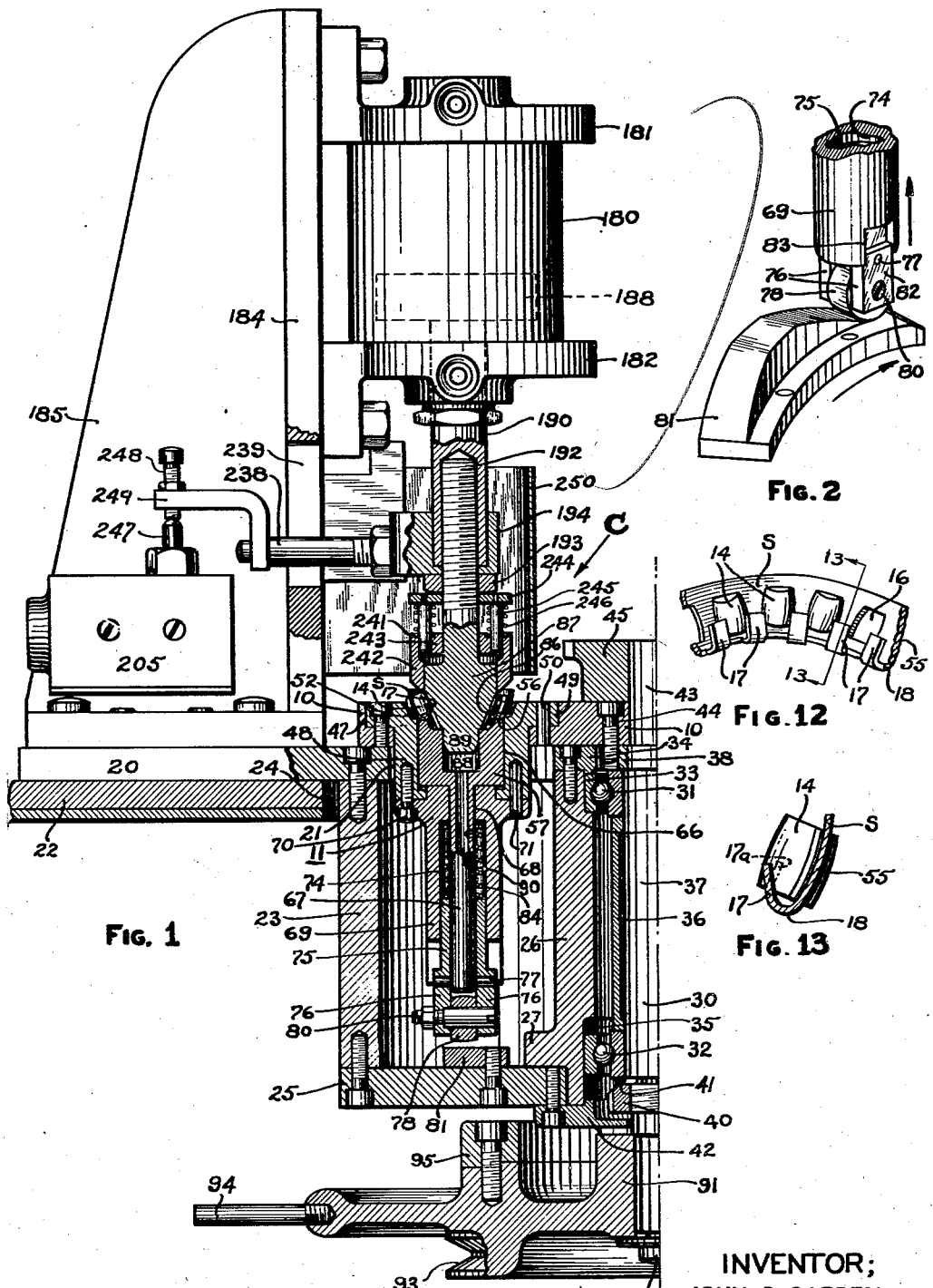

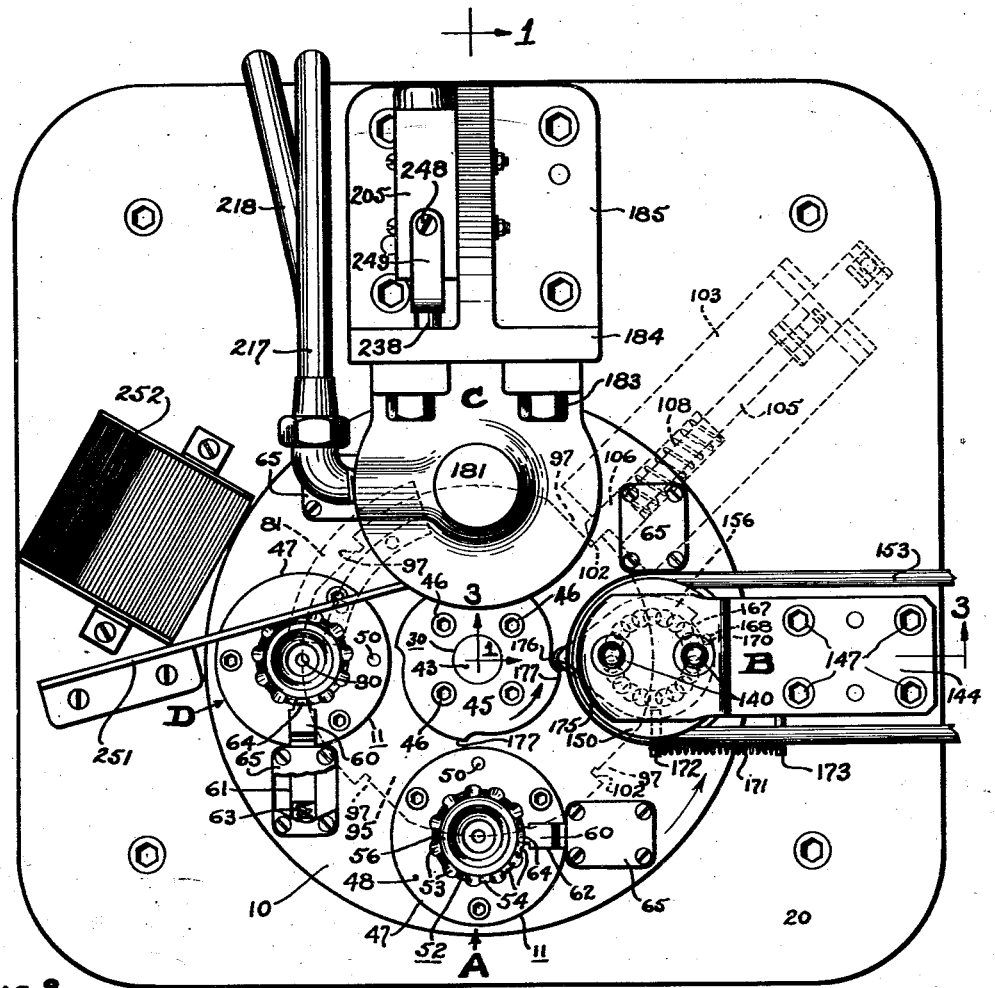
Fig. 8
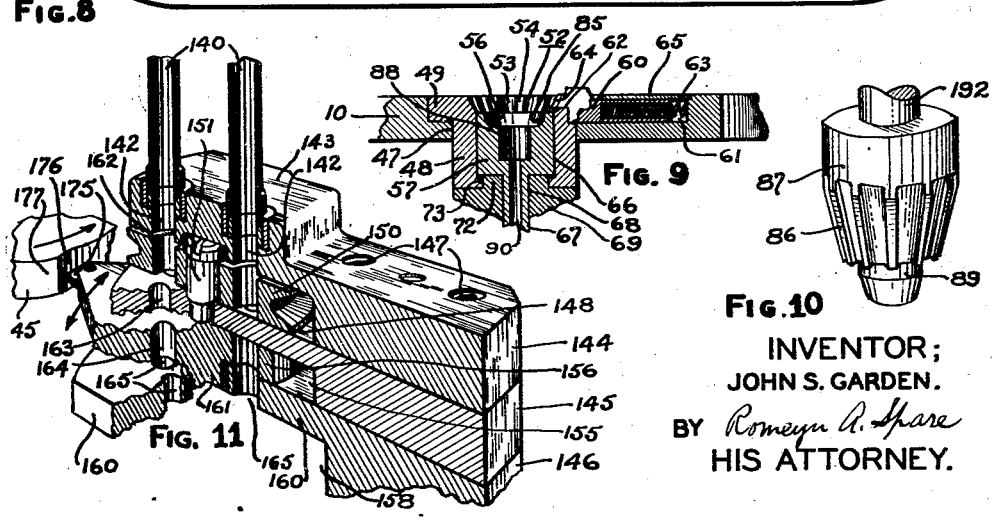
Fig. 9
Fig. 10
Fig. 11
INVENTOR;
JOHN S. GARDEN.
BY Romeyn R. Spare
HIS ATTORNEY.

Feb. 25, 1947. J. S. GARDEN 2,416,578
SEPARATOR LOADING MACHINE
Filed June 30, 1942 4 Sheets-Sheet 4

INVENTOR;
JOHN S. GARDEN.
BY Romeyn A. Spare
HIS ATTORNEY.

Patented Feb. 25, 1947

2,416,578

UNITED STATES PATENT OFFICE 2,416,578

SEPARATOR LOADING MACHINE

John S. Garden, Basking Ridge, N. J., assignor to General Motors Corporation, Detroit, Mich., a corporation of Delaware Application June 30, 1942, Serial No. 449,181

4 Claims. (Cl. 29—201)

This invention relates to separator loading machines and comprises all of the features of novelty herein disclosed.

An object is to provide an improved mechanism for loading an antifriction bearing separator or the like with rotatable bearing elements. Another object is to provide an improved mechanism for rapidly filling a bearing separator or cage with rolling elements and for securing these rolling elements in unit-handling relation with the bearing cage. A further object is to provide a loading mechanism for simultaneously producing various operations upon a plurality of antifriction bearing cages at successive work stations, and which sequentially loads each cage with rolling elements, secures these elements in cage-assembled relation and thereafter discharges each assembly of cage and rolling elements.

To these ends and also to improve generally upon devices of the character indicated, the invention consists of the various matters hereinafter described and claimed. In its broader aspects, the invention is not necessarily limited to the specific construction selected for illustrative purposes in the accompanying drawings in which Figure 1 is a fragmentary view taken generally in vertical section along the lines 1—1 of Figure 8 and showing the mechanism which secures the rolling elements within the cage;

Figure 2 is a fragmentary perspective view of the lifting mechanism for the cage supporting nest;

Figure 3 is a fragmentary view in vertical section taken along the lines 3—3 of Figure 8 and which illustrates the cage loading mechanism and the turntable indexing control;

Figures 4 and 5 show the successive positions of the latch mechanism which withdraws and releases the indexing plunger;

Figure 6 is a fragmentary elevation of the indexing plunger and associated parts taken substantially along the line 6—6 of Figure 3;

Figure 7 is a perspective view of the indexing latch and its mounting;

Figure 8 is a plan view of my invention;

Figure 9 is a vertical fragmentary section showing a cage nest and its associated parts;

Figure 10 is a perspective view of the cage bending member;

Figure 11 is a fragmentary perspective view generally in vertical section and showing the cage loading mechanism;

Figure 12 is a fragmentary perspective view showing the rollers mounted in the cage;

Figure 13 is a vertical section taken along the lines 13—13 of Figure 12; and

Figure 14:
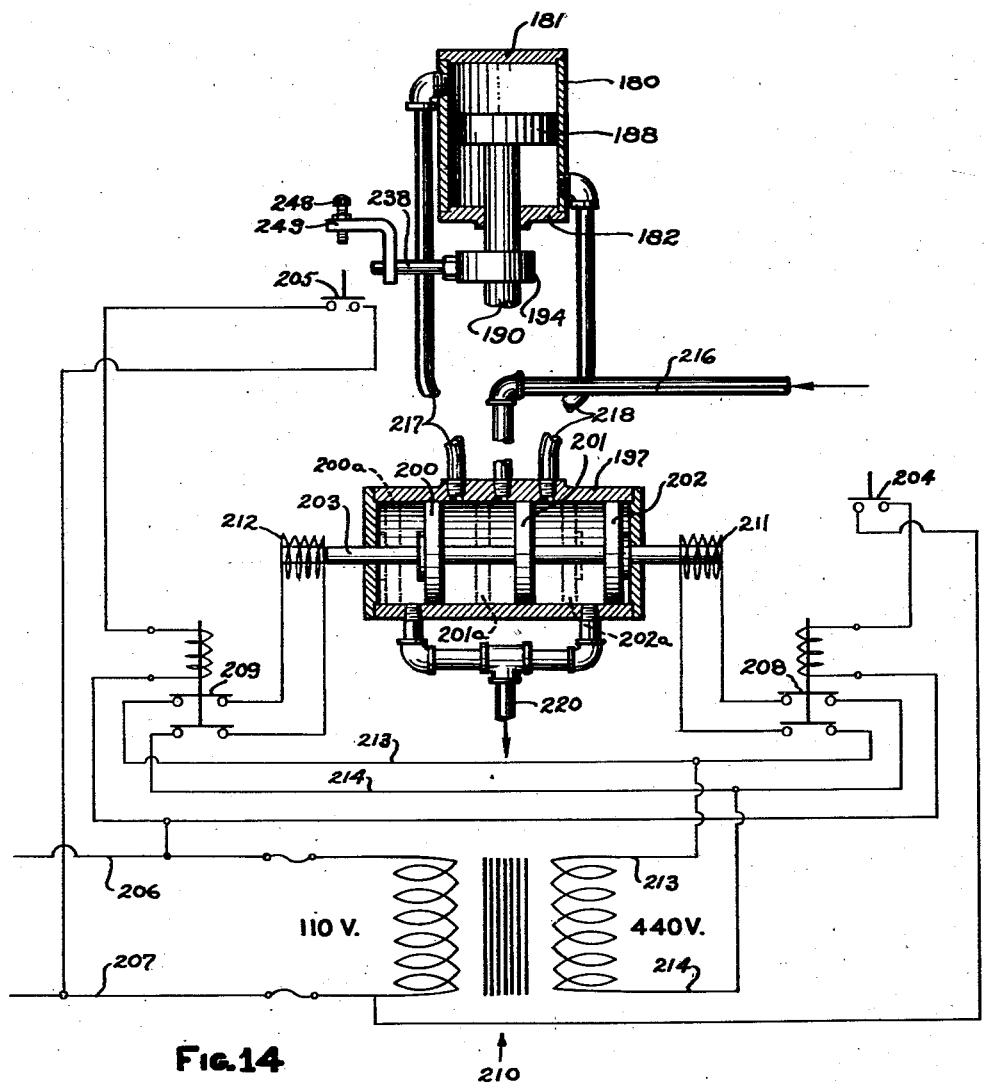
Figure 14 is a diagrammatic showing of the electrical circuit and parts operated thereby.

Generally stated, this invention comprises a rotatably driven turntable or carrier 10 that carries four annularly and uniformly spaced duplicate work supports 11, each of which has a work nest adapted to removably receive an antifriction bearing separator or cage S. A foot treadle 12 is operated to index this turntable 10 through consecutive quarter-turns so that each work nest is intermittently advanced to the four successive stations designated at A, B, C and D. Each time that a work support 11 reaches the station A, the operator places an empty cage S in the cage-receiving nest in the top of this work support. At the end of the next indexing operation and while the operator is placing another cage in the previous work nest at station A, a feeding mechanism automatically inserts rolling elements 14 in cage apertures 16 of the cage S at station B. Upon completion of the following indexing operation of the roller-filled cage S to station C and while the operator is placing another cage in the nest at station A and while the cage at station B is being filled with rollers 14, cage fingers 17, extending upwardly between the rollers 14 from an inwardly curled annular base flange 18, are bent generally towards the rollers to the position 17a (Figure 13) to loosely secure these rollers in freely rotatable relation within the cage S. During the following indexing operation and while the roller and cage assembly is being transported from station C towards station D, mechanism ejects this assembly from the machine.

In the illustrated embodiment, a base plate 20, apertured at 21 to receive a turntable supporting and rotating mechanism, is mounted on a suitably fixed bed 22, and an annular casing 23, secured as by screws to the underside of the base plate 20 around the aperture 21, extends downwardly through a bore 24 in the bed 22. A base ring 25, fastened to the bottom of the casing 23 as by screws and a locating pin, has a central bore which demountably receives the reduced lower end of an upwardly extending bearing housing 26 that has a lower flange 27 seated on this base ring centrally within the casing 23 and secured in position as by screws 28. A drive shaft 30, vertically extending through the housing 26, is rotatably supported by antifriction bearings 31 and 32 respectively mounted in the upper and lower ends of the housing 26. The upper bearing 31 has an outer race ring seated on a shoulder at the bottom of a housing counterbore 33 and demountably secured in position by a collar 34 fastened as by screws to the top of the housing 26. The outer race ring of the lower antifriction bearing 32 is slidably received in a lower housing counterbore 35. A sleeve 36 axially spaces the inner race rings of the bearings 31 and 32, and these inner race rings are mounted on an intermediate shaft portion 37 beneath an annular shaft flange 38 which seats upon the inner race ring of the upper bearing 31 to vertically support the shaft 30. A nut 40, threaded on a shaft reduction beneath the intermediate shaft portion 37, holds a lock washer 41 against the inner race ring of the lower bearing 32 to demountably secure the shaft 30 within its bearings, and a dust cap 42 is detachably fastened to the underside of the base ring 25 in closely surrounding relation to the shaft 30 beneath the nut 40. The turntable 10, which is centrally bored to fit over a reduced upper end 43 of the shaft 30, is demountably fastened as by screws 44 upon the shaft flange 38, and this turntable, which overlaps the base plate aperture 21, is preferably supported slightly above the base plate 20 and the collar 34. A loading cam 45, fitted over the upper shaft reduction 43, is secured to the turntable 10 by screws 46. This cam is arranged to operate the cage loading mechanism at station B so that an empty cage S will be filled with rolling elements 14 in a manner to be later described.

The turntable 10 has four uniformly spaced bores 47 each of which demountably receives one of the duplicate work supports 11. These bores 47, which have counterbored upper ends, correspond in number and in relative annular spacing to the four stations A, B, C and D, and a turntable indexing mechanism (to be later described) is so arranged that each time the foot treadle 12 is depressed, the turntable will advance one-quarter turn and shift each work support from one work station to the next work station. Each work support 11 includes a generally cup-shaped member 48 depending through one of the bores 47 and supported flush with the top face of the turntable 10 by means of an annular flange 49 secured as by screws in the counterbored upper end of the bore 47 and angularly located as by a pin 50. As best illustrated in Figures 8 and 9, a generally frusto-conical work nest 52, formed in the top of each member 48, has a peripheral wall containing a series of annularly spaced pockets 53 which alternate with spaced cage locating portions 54, these pockets 53 and cage locating portions 54 being contoured to matingly receive and support a cage S filled with the correctly positioned rolling elements which in the present instance are illustrated as the barrel shaped rollers 14.

In the present showing, my cage S (Figures 12 and 13) comprises an annular longitudinally rounded body 55 having a generally frusto-conical form and provided with the uniformly spaced roller-receiving apertures 16 which are of such a size and shape as to loosely receive the barrel shaped rollers 14 and prevent them from completely passing therethrough. The lower end of this body 55 is bent to provide the inwardly curled annular base flange 18 from which project the upwardly directed roller-retaining fingers 17 that initially extend angularly away from the body 55 (Fig. 13) and in substantial radial alignment with the body portions of the cage between the openings 16. When a cage S is placed in the nest 52 at station A, it is supported on its base flange 18 by a flat annular seat 56 on a plunger head 57 that is vertically slidable in the cup-shaped member 48, and this cage S is radially located by the cage locating portions 54 which preferably conform to the curvature of the body 55.

Each empty cage S placed in the nest 52 at station A, is rotatably located by a plunger 60 to radially align the cage openings 16 with the pockets 53 so that at station B the rollers 14 may be dropped into these cage openings 16 as will be later described. Each plunger 60 is longitudinally slidable in a turntable slot 61 and in a cooperating slot 62 radially extending through the flange 49 into one of the pockets 53, and a plunger spring 63 urges the plunger against a shoulder in the flange 49 so that a locating tongue 64 on the head of this plunger will partially project into the nest 52 through this pocket 53 and slidably interfit within one of the cage apertures 16 as illustrated in Figs. 8 and 9. A cover plate 65 is demountably fastened in position with its top face in the plane of the top of the turntable and overlying the slot 61, and the spring 63 is made sufficiently yieldable so that the tongue 64 will be pressed out of cage engagement whenever a roller 14 is dropped into this cage opening during the cage loading operation at station B.

Each cage-supporting plunger head 57 is vertically slidable in a counterbore 66 that extends downwardly from the bottom of the work nest 52, and a plunger stem 67, projecting coaxially downwardly from this head 57, is vertically slidable in a bore 68 at the upper end of a downwardly extending plunger guide 69 that is demountably fastened as by screws 70 and a locating pin 71 to the lower end of the member 48. A reduced cylindrical upper end 72 of the plunger guide 69 projects upwardly through a bore 73 in the bottom of the member 48 and into the counterbore 66 as shown in Fig. 9. The lower end of this plunger guide 69 is counterbored at 74 to vertically and slidably receive a sleeve portion 75 fitted over the lower end of the plunger stem 67, and a clevis 76 formed on the lower end of this sleeve portion 75 is secured to the stem 67 by a cross pin 77. A cam roller 78, rotatable on a stud 80 mounted in the depending clevis arms, is engageable with an arcuate cam shoe 81 fastened on the base ring 25 as by screws, and this roller is prevented from turning about a vertical axis out of arcuate cam alignment by a clevis arm projection 82 which may vertically slide in a slot 83 in the bottom of the plunger guide 69 as shown in Figure 2. A coiled spring 84 in the counterbore 74 is longitudinally compressed between the top of this counterbore 74 and the top of the sleeve portion 75 to urge the plunger downwardly to its bottom position (Figure 1) wherein the plunger head 57 is supported on the top of the plunger guide 69 and the cam roller 78 lies in a position to engage the cam 81. As shown in Fig. 8, the cam shoe 81 is short and engages the roller 78 between the stations C and D to lift the plunger head 57 as each work support 11 approaches the station D.

The upper end of each plunger head 57 has a dished cavity 85 (Figure 9) which provides clearance for the lower end of a tapered fluted portion 86 on a cage deforming member or plunger 87 employed at station C to bend the cage fingers 17 to the roller-securing positions 17a, and a counterbore 88, extending downwardly from the cavity 85, is arranged to slidably receive and guide the necked lower end 89 of the plunger. A bore 90 extends downwardly in the stem 67 from the counterbore 88, and a hole through the side wall of this stem communicates both with the bore 90 and with the counterbore 74 so that air cannot become trapped within the counterbore 74 and impede upward movement of the clevis 76 and the cage-supporting plunger head 57.

Successive quarter turns are imparted to the turntable by an intermittently indexed driving wheel 91 keyed to the reduced lower end of the shaft 30 and held against a shaft shoulder by a screw 92. A V-shaped pulley groove 93 in the driving wheel receives a suitable driving belt (not shown), and this driving wheel has a hand gripping rim from which extend spokes 94 to facilitate manual positioning of the turntable 10 when desired. An indexing ring 95, seated on a stepped driving wheel flange, is demountably fastened to this driving wheel by screws and angularly positioned by a pin 96. The cylindrical periphery of the indexing ring 95 is interrupted by four uniformly spaced notches 97 each of which has a radially disposed end wall 102. A bracket 103, secured to the underside of the base ring 25, slidably receives an indexing plunger 105 that is provided with a head 106 which extends out of a bracket slot 107, and a coiled spring 108 within a bracket recess urges this head towards the indexing ring 95. A nose 110 on the head 106 has a flat face 111 that is successively engaged by these end walls 102 to stop each indexing operation.

The outer end of the bracket 103 has a pair of spaced downwardly projecting arms 112 between whose lower ends is pivotally supported a bell crank lever 113 upon a cross pin 114 mounted in these arms. An outwardly extending arm 115 of this bell crank is pivotally connected at its outer end to the upper end of a longitudinally adjustable link 116 that has its lower end pivotally connected to the foot treadle 12 which is pivotally supported by a pin 117 mounted in a fixed supporting bracket 118 as shown in Figure 3. As best illustrated in Figures 3 and 7, a yoke portion 120 projects upwardly from the inner end of the bell crank lever 113 and between the depending arms 112, and a latch member 121, in the general form of a bell crank, is pivotally supported within the upper end of this yoke portion 120 by a cross pin 122. An upwardly extending finger 123 of the latch member 121 has its upper end operatively engageable with a collar 124 secured by nuts to the reduced rearward end of the indexing plunger 105, and a coiled spring 126, seated within a recess in the bell crank lever 113, resiliently engages the underside of the finger 123 and tends to normally turn the latch member 121 counterclockwise about the pin 122 to a position wherein a depending latch arm 127 abuts against an end shoulder 128 on the bell crank lever 113. A coiled spring 130 tensioned between a stop pin 131, mounted in the arms 112, and a clamp adjustably secured to the link 116, yieldably urges the foot treadle 12 and its associated parts upwardly to their initial operative positions of Figure 3.

To index the turntable 10 through a quarter turn so that each work support 11 will be simultaneously transferred to the next work station, the operator depresses the foot treadle 12 causing a clockwise swinging movement of the latch 121 from the position of Figure 3 through the position of Figure 4 to the position of Figure 5. During this movement, the finger 123 first engages and shifts the collar 124 rearwardly to the position of Figure 4 and then snaps beneath and past this collar to the further position of Figure 5. At this time, the latch 121 is restrained from pivotal movement on its supported pin 122 by the abutting engagement of the depending arm 127 against the shoulder 128. The outward movement of the collar 124 to the position of Figure 4 withdraws the indexing head 106 from engagement with one of the end walls 102, and the belt within the pulley groove 93 imparts a slow counterclockwise rotation to the driving wheel 91 which acts through the driving shaft 30 to turn the turntable 10 and slowly advance each work holder 11 towards the next work station. After the finger 123 snaps past the collar 124, the coiled spring 108 urges the plunger nose 110 into peripheral engagement with the indexing ring 95 which continues to turn until the succeeding end wall 102 of the next notch 97 abuts against the plunger face 111 which stops the turntable rotation with each of the work nests 52 located at the next work station. While the turntable 10 is secured at each indexed position, the driving belt may slip within the pulley groove 93, or if preferred, slippage may occur in a suitable driving clutch mechanism not shown. To further assist in holding the turntable in each of its indexed positions, each notch 97 may also be slightly recessed at the inner radial end of each end wall 102 to receive the point of the nose 110 as best illustrated in Figure 6. During the return of the treadle 12 and the associated parts to their initial positions of Figure 3 under influence of the spring 130, a sloping portion 129 of the finger 123 engages a bevelled annular portion 132 of the collar 124 and causes the latch 121 to pivot clockwise on its cross pin 122 so that this finger will snap past the collar 124 to its initial operative position illustrated in Figure 3.

The rolling elements 14 are fed from a suitable hopper (not shown) to the cage loading station B in end to end relation down a pair of spaced feed tubes 140 whose lower ends are mounted in adapter sleeves 141 that are demountably fastened in the counterbored upper ends of spaced feed bores 142 which vertically extend through a boss 143 on the stepped inner end of a feed tube support 144. This feed tube support is mounted on a roller spacer 145 which is mounted on a roller transfer support 146 on the base plate 20, and these members 144, 145 and 146 are secured in superimposed relation on the base plate 20 by screws 147 and locating pins. A loading disc 150, supported on the flat upper face of the roller spacer 145 and located within a recess 148 in the feed tube support 144, is journalled for rotation on a vertical stud 151 fastened at its lower end to the roller spacer 145 and positioned co-axially of the vertical axis of the cage S located at station B. A screw 152, provided with a head received in a recess on the under side of the boss 143, is threaded in the upper end of the stud 151 to demountably secure the loading disc 150 in position. A suitably driven belt 153 engages within a loading disc groove 154 and continuously rotates this loading disc at a suitable slow rate of speed such as 10 R. P. M. The roller spacer 145 has a recess 155 beneath the loading disc 150 to receive a roller transfer member 156 which is arcuately oscillated by the loading cam 45, and the roller transfer support 146 is provided with a similar recess 158 through which the cages S may be successively carried by the rotating turntable 10 in closely spaced relation to the under side of a horizontally disposed lip 160 of the roller transfer support 146. The roller transfer member 156, which is supported on the flat upper face of the lip 160, has a downwardly projecting shaft portion 161 journalled in a vertical bore in the lip 160 and axially coincident with the vertical axis of the cage S located at station B.

The loading disc 150, roller spacer 145, roller transfer member 156 and the lip 160 are each provided with a circular series of roller-receiving bores vertically extending therethrough and respectively indicated at 162, 163, 164 and 165 (Figures 3 and 11). The bores of each series correspond in number and in relative uniform spacing to the roller-receiving cage apertures 16 of each cage S, and the pitch circle of each series of bores has an axis common with the vertical axis of the cage S located at station B. The feed bores 142 are spaced to simultaneously direct rollers 14 from the feed tubes 140 into the loading disc bores 162 on opposite sides of the stud 151. The thickness of the loading disc 150 is equivalent to twice the axial length of one of the rollers 14 so that each bore 162 may receive two rollers in end to end relation with the top end faces of the upper rollers lying substantially in the plane of the top face of the loading disc. The thickness of the roller spacer 145 beneath the loading disc is equivalent to the axial length of a single roller 14 so that the bores 163 may each receive a single roller. The thickness of the roller transfer member 156 is also equivalent to the axial length of a single roller 14 so that the bores 164 may each receive a single roller. The bores 165 axially align respectively with the cage apertures 16 therebeneath at station B, and the axes of the bores 163 are respectively located intermediate of the axes of the corresponding bores 165.

The roller transfer member 156 is arcuately oscillated between two extreme positions wherein the bores 164 register in axial alignment alternately with the bores 163 thereabove and then with the bores 165 thereneath, and an arcuate notch 167 in this roller transfer member that receives a stop pin 168, has an end wall 170 engageable with this stop pin to locate one of these extreme positions with the bores 164 in register with the bores 165 (Figure 8). A coiled spring 171, tensioned between a laterally projecting stud 172 in the roller transfer member 156 and a stud 173 in the member 145, urges this roller transfer member counterclockwise so that a cam roller 175, journalled on a vertical stud in a projecting nose-portion of the roller transfer member, is presented into engagement with the loading cam 45. This loading cam, which rotatably indexes in unison with the turntable 10 in a counterclockwise direction, has four uniformly spaced similar low points 176 that respectively correspond to the positions of the four work nests 52 in the turntable, and these low points are so radially spaced from the axis of loading cam rotation that the spring 171 may locate the end wall 170 against the stop pin 168 causing the bores 164 to register with the bores 165 each time that one of the low cam points 176 is positioned opposite the work station B as shown in Figure 8. The loading cam 45 also has four high points 177, each being respectively adjacent to one of the low points in a direction clockwise on the loading cam as viewed in Fig. 8, and the loading cam periphery gradually and arcuately recedes in a clockwise direction from each high point to the following low point. When the cam roller engages one of the high points 177, the bores 164 register in axial alignment with the bores 163 thereabove.

At station B, rollers 14 drop from the feed tubes 140 into the slowly rotating loading disc 150 and fill each of the bores 162 with two rollers, and these bores 162 after a slight turning of the disc direct a single set of rollers 14 into the bores 163 thereneath. At the start of each indexing operation of the turntable 10, the cam roller 175 quickly rides from one of the low points 176 onto one of the high points 177 and turns the roller transfer member 156 clockwise to the position wherein the bores 164 register with and receive a set of rollers from the bores 163. At this time, the rollers cannot feed downwardly from the roller transfer member 156 since the bores 164 are out of register with the bores 165 thereneath. As the rollers 14 feed out of roller spacer bores 163, rollers from the rotating loading disc 150 drop into and again fill the bores 163, and rollers drop from the feed tubes 140 to again fill the loading disc bores 162. The receding contour of the slowly rotating loading cam 45 now causes a slow counterclockwise rotation of the roller transfer member 156 that continues until the indexing mechanism stops the turntable with the empty cage S located at station B.

Coincident with the location of this cage at station B, the cam roller 175 reaches the low cam point 176, and the bores 164 register with bores 165 causing the rollers to drop from these bores 164 through the bores 165 and to simultaneously fill all of the cage apertures 16 thereneath. At the next indexing operation, the same cycle of operations is repeated with respect to another empty cage S placed in the following work nest 52 at station A, and the rotating turntable transports the now filled work cage S from station B to station C where the cage fingers 17 are bent inwardly to the positions 17a (Figure 13) to loosely secure the rollers in unit-handling relation with the cage.

A fluid pressure cylinder 180, located above the station C, is provided with upper and lower heads 181 and 182 having feet which are secured as by screws to the vertical wall 184 of a bracket 185 that is rigidily mounted on the base plate 20 as by screws and locating pins. A vertically slidable piston 188 in this cylinder is fastened to the upper end of a piston rod 190 extending through a stuffing box in the lower cylinder head 182 and movable along the vertical axis of the cage S at station C. A reduced upper stem 192 of the plunger 87 is threaded within the lower end of the piston rod 190 and secured in adjusted position by a lock nut 193 which also secures a collar 194 in position on the lower end of the piston rod.

A reversing valve diagrammatically illustrated in Figure 14, has a cylinder 197 within which is slidably mounted three spaced pistons 200, 201 and 202 that are fastened on a piston rod 203 which slidably extends out through heads on the ends of this cylinder. Electric switches 204 and 205, that normally assume open circuit positions, may be selectively closed to deliver current from supply lines 206 and 207 to relays 208 and 209 to respectively shift these relays to closed circuit positions, and when these switches 204 and 205 are opened, the respective relays again assume open circuit positions. A transformer 210 has a primary winding connected to the supply lines 206 and 207, and solenoids 211 and 212 are selectively energized by the respective closing of the relays 208 and 209 which connect the transformer secondary winding to these solenoids through lead wires 213 and 214.

When the switch 204 is closed, the energized solenoid 211 acts on the piston rod 203 and shifts this piston rod and the pistons to their full line positions 200, 201 and 202. At this time, suitable fluid, which in the present instance may comprise air, is delivered under pressure from a pump (not shown) through a pipe 216 into the reversing valve chamber between the pistons 200 and 201 from which the fluid pressure is directed through a pipe 217 into the top of the cylinder above the piston 188 causing a downward movement of the plunger 87 to produce the cage-finger bending operation hereinafter described. During the downward movement of the piston 188, fluid will exhaust from the bottom of the cylinder 180 beneath the piston 188 out through a pipe 218 into the reversing valve between the pistons 201 and 202 and thence out through an exhaust pipe 220.

When the switch 205 is closed, the energized solenoid 212 acts on the piston rod 203 and shifts the valve pistons to their reversed positions of 200a, 201a, and 202a as indicated in dot and dash lines in Figure 14. At this time, fluid under pressure from the pipe 216 enters between the piston positions 201a and 202a and is directed out through the pipe 218 into the cylinder 180 beneath the piston 188 which results in lifting the plunger 87 out of and above the cage S at station C. Fluid in the top of the cylinder 180 above the piston 188 will now exhaust through the pipe 217 into the reversing valve between the piston positions 200a and 201a and thence out through the exhaust pipe 220.

The switch 204 (Figure 3), which is secured to a bracket 223 on the underside of the bed 22 and above the indexing collar 124, has an operating plunger 224 that rests on the inner end of a substantially horizontally disposed lever 225 which is pivoted at its outer end on a stud 226 mounted in a depending arm 227 of the bracket 223. A coiled spring, socketed at its upper end in a pocket in this bracket, yieldably urges the lever 225 downwardly against a stop pin 228 in the arm 227, and when the lever 225 rests on this stop pin, the plunger 224 holds the switch 204 in open circuit position. An upstanding trigger 230, pivoted on a transverse pin 231 in an upwardly projecting portion 232 of the indexing collar 124, is yieldably urged clockwise against a stop pin 233 by a coiled spring 234. As shown in Figure 3, the upper end of this trigger normally projects slightly above the lower end of a depending nose 235 on the end of the lever 225 beneath the plunger 224.

At the start of an indexing operation and while the indexing plunger and associated parts are being withdrawn from the positions of Figure 3 to their positions of Figure 4, the trigger 230 abuts against the depending nose 235 and is swung counter-clockwise by this nose to the dot and dash position of Figure 4, and during this movement the trigger 230 snaps under and past the nose 235 to its original position against the pin 233. This trigger movement past the nose 235, which occurs prior to the time when the finger 123 snaps past the indexing collar 124, does not lift the lever 225 to operate the switch 204. During the ensuing return movement of the indexing plunger 105 from the position of Figure 5 to the position of Figure 3 and just prior to the engagement of the next notch wall 102 with the plunger head 106, a sloping portion of the trigger 230 cams against a sloping portion 236 of the depending nose 235 and swings the lever 225 upwardly to move the plunger 224 upwardly and close the switch 204 which results in a movement of the reverse valve pistons to the full line positions of Figure 14 with a consequent downward movement of the plunger 87 to the cage finger bending position of Figure 1. The closing of the switch 204 is so timed that the immediately subsequent downward movement of the plunger 87 into the cage S at station C occurs only after the turntable 10 has been stopped with each work nest 52 located at one of the work stations. The top of the trigger 230 and the bottom of the depending nose 235 are provided with flat faces of sufficient extent to hold the switch 204 closed long enough to cause the solenoid 211 to completely shift the reverse valve pistons from the position 200a, 201a, and 202a to the positions 200, 201 and 202. When the indexing plunger 105 reaches its innermost position of Figure 3, the trigger 230 has passed by the depending nose 235, and the lever 225 is again spring-pressed downwardly onto the stop pin 228, and the switch 204 has returned to open circuit position.

As the plunger 87 is moved downwardly into the roller-filled cage S at station C (Figure 1), the necked lower end 89 of this plunger is slidably received in and guided by the counterbore 88, and the flutes of the fluted portion 86 respectively engage the cage fingers 17 and bend these fingers to the positions 17a (Figure 13) to loosely secure the rollers 14 within the cage. The bottom position of this plunger movement is located by the engagement of a plunger shoulder against a horizontal face in the bottom of the work nest 52 as shown in Figure 1. A stud 238, secured at its inner end to the collar 194, laterally projects through a vertical slot 239 in the bracket wall 184 and prevents turning of the plunger 87 which is clamped by the nut 193 in such angularly adjusted position that the flutes 86 radially align respectively with the fingers 17 of the cage S supported in the work nest at station C. The cage S is rotatably positioned by the interfitted relation of the rollers 14 in the nest pockets 53.

A cup-shaped pressure collar 241 has a lower sleeve portion 242 slidably fitted over the enlarged upper cylindrical end of the plunger 87 and an upper end wall 243 centrally bored to slidably fit over the stem 192 adjacent to the crimping punch. A guide pin ring 244, threaded on the stem 192 and screwed tightly against the nut 193, supports in spaced relation a plurality of depending guide pins 245 whose lower ends are slidably received in bores in the top of the pressure collar 241. Coiled springs 246 on the guide pins 245 and compressed between the guide pin ring 244 and the top of the pressure collar urge this pressure collar downwardly towards a position wherein the upper end wall 243 rests on the top of the plunger 87 and the bottom of the sleeve portion 242 extends below the upper end of the fluted portion 86.

During the downward movement of the plunger 87 into a roller-filled cage S at station C and just prior to the cage finger bending action of the fluted portion 86, the annularly bevelled lower end of the sleeve portion 242 engages and presses downwardly on the tops of the rollers 16 to secure the roller-filled cage in proper position in the work nest 52. In the continued downward movement of the plunger 87 to the final position of Figure 1, the plunger 87 slides downwardly through the pressure collar 241 which is still held against the rollers 16 by the further compressed springs 241. During the ensuing withdrawal of the plunger 87, the pressure collar 241 continues to hold the roller-filled cage S in the work nest until the plunger 87 is withdrawn from wedged engagement against the cage fingers 17 so that this withdrawal of the plunger 87 cannot remove the work cage and rollers from the work nest at station C.

The switch 205 (Figure 1), that is secured to the bracket 185 and which normally assumes an open circuit position, has an operating plunger 247. Just prior to the completed downward movement of the plunger 87, a screw 248, threadably adjusted in an angle arm 249 on the outer end of the stud 238, presses the plunger 247 to a switch closing position whereupon the solenoid 212 is energized and the reverse valve pistons are shifted to their dot and dash positions of Figure 14 which results in the upward movement of the piston 188 to the top of the cylinder 180 and the consequent withdrawal of the plunger 87 above the roller-filled cage at station C. A guard 250, mounted on the bracket 184, surrounds the plunger 87 and associated parts in spaced relation and prevents the machine operator from accidental injury.

When the plunger 87 has returned upwardly out of operative position, the operator again steps on the foot treadle 12 and starts the turntable 10 in another indexing operation. Shortly after the roller-filled cage leaves station C, the roller 78 at the lower end of the work support 11 engages the cam 81 and is moved upwardly to raise the plunger head 57 to a position substantially in the plane of the top face of the turntable 10, and a baffle 251, secured to the bed 20 and angularly overlying the turntable in spaced relation, is now engaged by the advancing roller and cage assembly and causes this assembly to be swept off of the turntable into a chute 252 which directs the roller-filled cage assembly into a suitable bin.

I claim:

1. In combination with a rotatable turntable for carrying a cage to and from a loading station, a loading mechanism at said station for inserting rolling elements in annularly spaced openings in said cage and comprising a roller-receiving member and a roller spacer and a roller transfer support mounted in superimposed relation above said turntable, a rotatable loading disc between the roller-receiving member and said roller spacer, a roller transfer member pivotally mounted between said roller spacer and said roller transfer support, said superimposed members and the loading disc and the roller transfer member having co-operating roller-receiving through bores, means for delivering rolling elements to said roller-receiving member, and means for selectively moving said roller transfer member into bore registering relation with the bores in the roller spacer and into bore registering relation with the bores in said roller transfer support.

2. In a device of the character indicated, a carrier for holding a cage provided with an annular series of spaced roller receiving openings, said carrier being movable to transport the cage to and from a loading position, a support above the carrier and having annularly spaced downwardly extending through bores in corresponding register with the roller receiving openings of a cage therebeneath at the loading position, a roller transfer member movable on said support and having annularly spaced roller-receiving through bores corresponding to the bores through said support, a roller feeding mechanism including a movable loading element above the roller transfer member and having a roller receiving through bore movable into and out of alignment with the roller transfer member bores, means to deliver rollers into said loading element bore, and means for moving the roller transfer member into bore registering relation with the corresponding support bores therebeneath each time that said carrier locates a cage at said loading position.

3. In a device of the character indicated, a movable carrier for transporting to and from a loading station a cage having a series of annularly spaced openings for receiving rolling elements, a loading mechanism for inserting rolling elements into the cage openings and comprising a support member above the cage at the loading station, a roller spacer member above said support member, a roller transfer member movable between said other members, a rotatable loading disc above the roller spacer member, each of said members being provided with an annular series of through bores in correspindingly spaced relation to each other as are the annularly spaced cage openings, said loading disc being provided with a through bore which is moved into and out of registering relation with the roller spacer bores and means for moving the roller transfer member into and out of bore-registering relation with the roller spacer bores thereabove and into and out of bore-registering relation with the support member bores therebeneath.

4. In a device of the character indicated, a movable carrier for transporting to and from a loading station a cage having annularly spaced openings for receiving rolling elements, a loading mechanism for inserting rolling elements into the cage openings and comprising a support member above a cage at the loading station, a roller spacer member located above the support member, a roller transfer member movable between said other members, a rotatable loading disc above the roller spacer member, said members and the loading disc being each provided with an annular series of downwardly extending through bores which are in correspondingly spaced relation to each other as are the annularly spaced cage openings, means for rotating the loading disc to bring its bores into and out of register with the roller spacer bores, and carrier operated mechanism for shifting the roller transfer member to selectively bring its bores into and out of register with the roller spacer bores and into and out of register with the supporting bores.

JOHN S. GARDEN.

REFERENCES CITED

The following references are of record in the file of this patent:

UNITED STATES PATENTS

| Number | Name | Date |
|---|---|---|
| 1,311,590 | Bingham | July 29, 1919 |
| 1,387,881 | Bingham | Aug. 16, 1921 |
| 1,517,574 | Morrison | Dec. 2, 1924 |
| 1,723,369 | Pew | Aug. 6, 1929 |
| 2,068,683 | Ketcham et al. | Jan. 26, 1937 |
| 2,075,050 | Nowinski | Mar. 30, 1937 |
| 2,222,605 | Carlson | Nov. 26, 1940 |
| 2,235,084 | Ortegren et al. | Mar. 18, 1941 |
| 2,255,626 | Ortegren et al. | Sept. 9, 1941 |
| 2,288,023 | Ortegren et al. | June 30, 1942 |
| 2,255,625 | Ortegren et al. | Sept. 9, 1941 |
| 1,311,590 | Bingham | June 29, 1918 |